United States Patent
Chiu et al.

(10) Patent No.: US 8,068,112 B2
(45) Date of Patent: Nov. 29, 2011

(54) IMAGE BUFFERING TECHNIQUES

(75) Inventors: Yi-Jen Chiu, San Jose, CA (US);
Mei-Chen Yeh, Goleta, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/643,884

(22) Filed: Dec. 21, 2009

(65) Prior Publication Data

US 2010/0098163 A1    Apr. 22, 2010

Related U.S. Application Data

(63) Continuation of application No. 11/395,028, filed on Mar. 31, 2006, now Pat. No. 7,656,410.

(51) Int. Cl.
*G06T 15/00* (2011.01)
(52) U.S. Cl. ............. 345/530; 345/532; 348/408.1
(58) Field of Classification Search .......... 345/530, 345/532; 358/132, 134, 142; 348/408
See application file for complete search history.

(56) References Cited

U.S. PATENT DOCUMENTS

| | | | |
|---|---|---|---|
| 5,227,876 A | 7/1993 | Cucchi et al. | |
| 5,557,419 A | 9/1996 | Muto | |
| 5,768,533 A | 6/1998 | Ran | |
| 6,818,080 B2 | 11/2004 | Sakamoto et al. | |
| 7,333,545 B2 * | 2/2008 | Duruoz et al. | 375/240.25 |
| 7,365,752 B2 * | 4/2008 | Xie | 345/560 |
| 7,446,774 B1 * | 11/2008 | MacInnis et al. | 345/519 |
| 7,636,934 B2 * | 12/2009 | Baldwin et al. | 725/101 |
| 7,656,410 B2 * | 2/2010 | Chiu et al. | 345/530 |
| 7,848,430 B2 * | 12/2010 | Valmiki et al. | 375/240.24 |
| 2007/0230584 A1 | 10/2007 | Chiu et al. | |

* cited by examiner

*Primary Examiner* — Phu Nguyen
(74) *Attorney, Agent, or Firm* — Kacvinsky Daisak PLLC

(57) ABSTRACT

A system, apparatus, method and article to perform buffering techniques are described. The apparatus may include a buffer having a fixed number of storage slots that store reconstructed picture representations received from an image processing module. Also, the apparatus may include a buffer status unit to store a multiple information items to indicate one or more buffer characteristics of the buffer. Further, the apparatus may include a buffer control module to manage storage within the buffer.

10 Claims, 7 Drawing Sheets

IMAGE BUFFERING TECHNIQUES

BACKGROUND

Image processing techniques, such as video encoding and decoding, often require the storage of image or picture representations for future use. For example, video encoders and decoders may store reference pictures for motion compensation operations. Many storage techniques may be inadequate for the efficient and effective buffering of such information. Thus, there is a need for such techniques.

DETAILED DESCRIPTION

Various embodiments may be generally directed to image buffering techniques. In one embodiment, for example, an apparatus may include a buffer having a fixed number of storage slots that store reconstructed picture representations received from an image processing module. Also, the apparatus may include a buffer status unit to store multiple information items indicating one or more buffer characteristics of the buffer. Further, the apparatus may include a buffer control module to manage storage within the buffer.

In this manner, the storage, access, and retrieval of picture representations may be performed in an efficient and effective manner. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
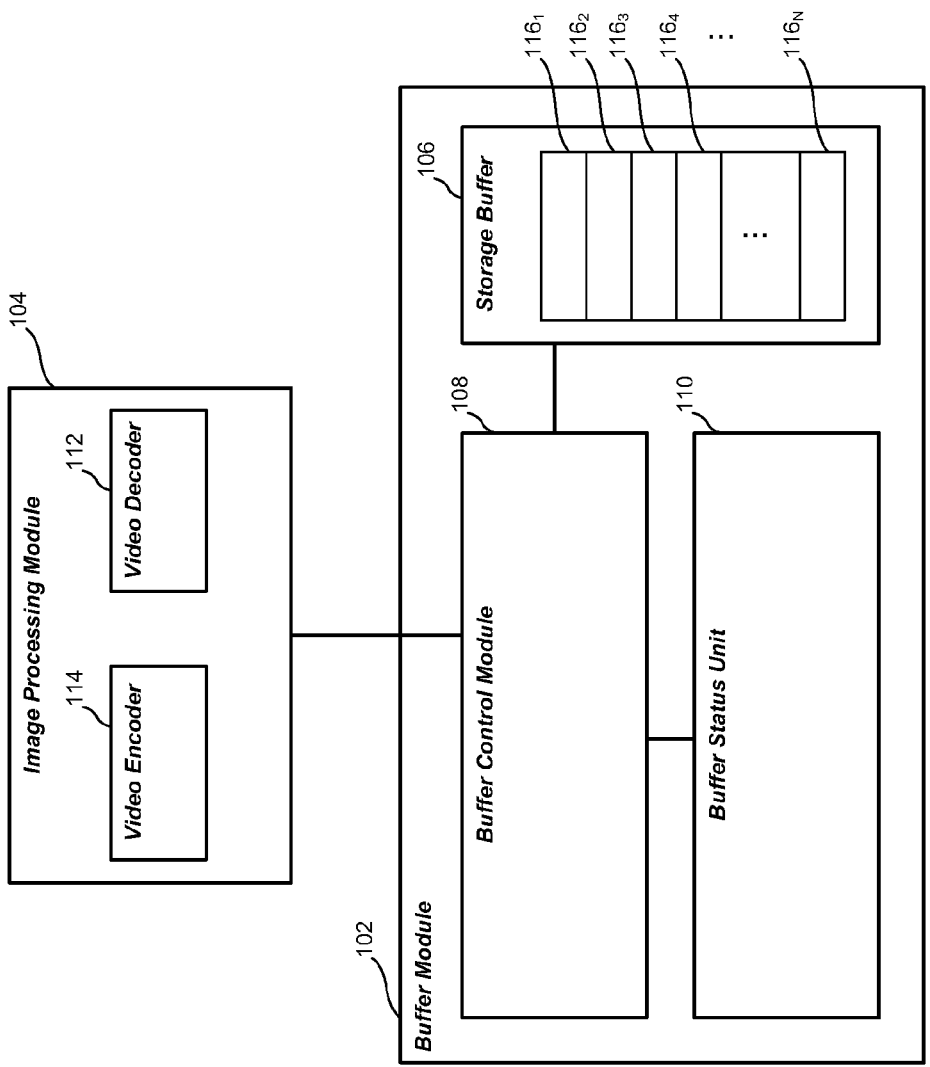
FIG. 1 illustrates one embodiment of an apparatus.

FIG. 1 illustrates one embodiment of an apparatus. In particular, FIG. 1 is a block diagram of an apparatus 100. As shown in FIG. 1, apparatus 100 comprises multiple elements, such as a buffer module 102 and an image processing module 104. Further, FIG. 1 shows that buffer module 102 may include a storage buffer 106, a buffer control module 108, and a buffer status unit 110. These elements may be implemented in hardware, software, or any combination thereof. The embodiments, however, are not limited to the elements shown in this drawing. For instance, embodiments may include greater or fewer elements, as well as other couplings between elements.

Buffer module 102 may receive and store representations of images (also referred to as picture representations or pictures) in storage buffer 106. These representations may be received from image processing module 104. In addition, buffer module 102 may provide image processing module 102 with such stored image representations.

Within buffer module 102, storage buffer 106 may include a fixed number of storage slots 116, each storage slot 116 to store one or more reconstructed picture representations. More particularly, each storage slot 116 may have two portions used to store complementary field picture representations (e.g., for interlaced video). Further, in such implementations, each storage slot (i.e., both portions) may be used to store a single frame picture representation. Parameter data corresponding to the stored reconstructed images may accompany these picture representations in each storage slot 116. Accordingly, FIG. 1 shows storage buffer 106 having a fixed number, N, storage slots 116.

Buffer status unit 110 may maintain various information items regarding characteristics of storage buffer 106. Examples of such information items are described below with reference to FIG. 2.

Buffer control module 108 manages the storage of image representations within storage buffer 106. This may involve, for example, deciding whether to store image representations received from image processing module 104. Also, this may involve storing image representations based on characteristics of storage buffer 106 that are discerned from buffer status unit 110. Further, this may involve updating information maintained by buffer status unit 110.

As described above, image processing module 104 may exchange image representations (also referred to as pictures or images) with buffer module 102. Such image representations may include reconstructed image data generated in accordance with decoding and/or encoding techniques or algorithms. Accordingly, FIG. 1 shows that image processing module 104 may include a video decoder 112 and/or a video encoder 114.

Such video encoding or decoding may be in accordance with various approaches. For instance, a hybrid transform-based motion compensated encoding scheme may be employed. Such encoding schemes may exploit spatial and temporal redundancies to reduce the amount of data needed to represent images. Thus, image processing module may employ technique(s) that comply, for example, with one or more Moving Pictures Expert Group (MPEG) standards, such as MPEG-2 and MPEG-4. Also, encoder 202 may comply with one or more standards established by the International Telecommunications Union (ITU) Telecommunication Standardization Sector (ITU-T). Examples of such standards include H.264, H.261, and H.263. The embodiments, however, are not limited to this example.

Figure 2:
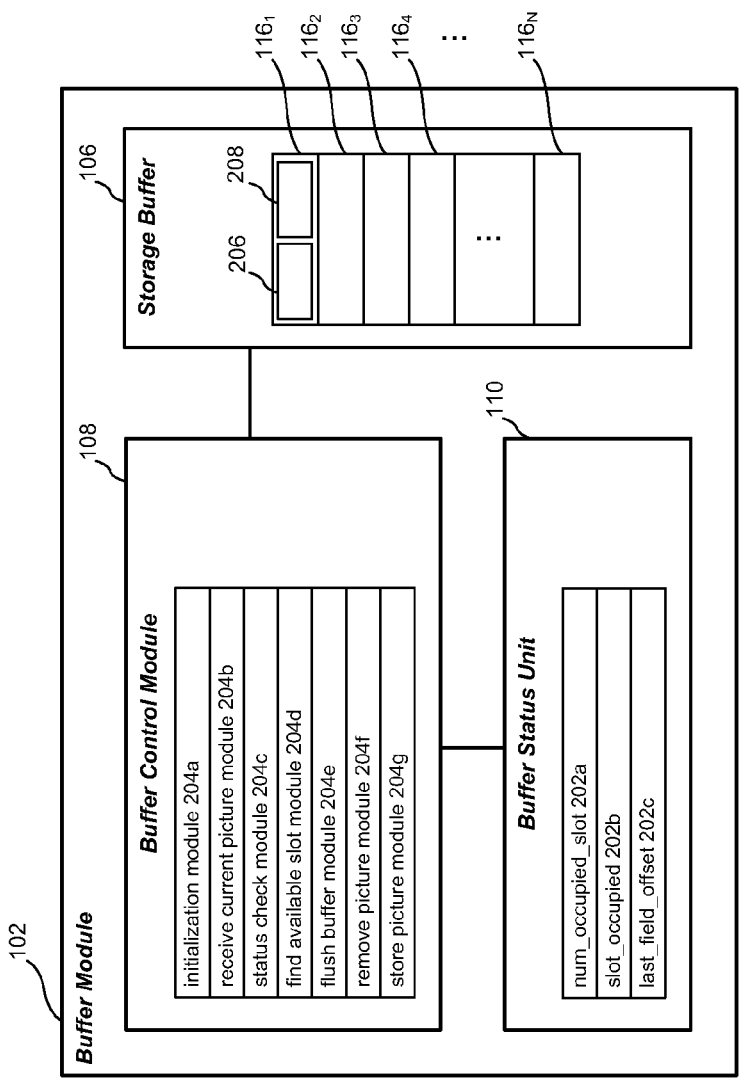
FIG. 2 illustrates one implementation embodiment of a buffer module.

FIG. 2 shows an exemplary implementation embodiment 200 that may be included within buffer module 102. As shown in FIG. 2, this implementation may include various elements. However, the embodiments are not limited to these elements. For instance, embodiments may include greater or fewer elements, as well as other couplings between elements. These elements may be coupled according to various techniques. Exemplary techniques include, one or more bus interfaces, network interfaces, software interfaces, and/or middleware. Moreover, these elements may be implemented in hardware, software, or any combination thereof. Exemplary software implementations may be based on object oriented development methodologies.

In particular, FIG. 2 shows that implementation 200 may include one or more status indicators 202 within buffer status unit 110, and one or more operational modules 204 within buffer control module 108.

As shown in FIG. 2, storage buffer 106 may include a fixed number of slots 116. This fixed number is also referred to herein as MaxSlotSize. Slots 116 may include a first portion for storing a first field picture and a second portion for storing a complementary second field picture. Accordingly, FIG. 2 shows slot $116_1$ having a first portion 206 and a second portion 208.

FIG. 2 shows that buffer status unit 110 may include various status indicators 202. For instance, buffer status unit 110 may include a number of occupied slots parameter 202a (also shown as num_occupied_slot). This parameter indicates the number of slots in storage buffer currently storing picture representations.

Also, buffer status unit 110 may include a slot availability data structure 202b (also shown as slot_occupied). This data structure indicates which particular slots are occupied. Accordingly, this data structure may be implemented in various ways. For instance, data structure 202b may be an array or vector of elements, where each element is a binary flag indicating the availability of a corresponding slot within storage buffer 106. Such an array or vector may be indexed by a slot number.

Alternatively or additionally, slot availability structure 202b may be implemented with a base memory address and memory offset(s) for the slots. The base address indicates a beginning of data structure 202b, while the memory offset(s) incrementally indicate addresses from the base address. The base address and offset(s) may be stored in various arrangements. In further alternatives, slot availability structure 202b may be implemented with a linked list or other suitable technique. The embodiments, however, are not limited to these implementations.

Buffer status unit 110 may further include a last field offset parameter 202c (also shown as last_field_offset). This parameter indicates a slot 116 within storage buffer 106 containing the most recently received single field picture. This parameter may be implemented as a slot index. Alternatively, this parameter may be implemented as a memory offset from a starting memory address of storage buffer 106. However, the embodiments are not limited to such.

As described above, buffer control module 108 may include a plurality of operational modules 204. These modules may perform various operations on storage buffer 106, and received picture representations. Additionally, these modules may perform operations that evaluate and/or modify one or more information items 202. Descriptions of exemplary operational modules 204 are provided in the following several paragraphs.

An initialization module 204a initializes status indicators 202. This may involve setting these indicators to initial conditions before buffer module 102 commences storing picture representations (e.g., before image processing module 104 begins video decoding and/or encoding). As an example, parameters 202a and 202c may be set to zero and each flag within data structure 202b may be set to a value (e.g., zero or null) indicating that the corresponding slot is available. An example of such an initial operation is described by the following pseudo code:

```
{
    num_occupied_slot = 0
    last_field_offset = 0
    slot_occupied[i] =0, for i =1 To MaxSlotSize
}
```

A receive current picture module 204b receives a current reconstructed picture representation (also referred to as the current picture). This current picture may be a reconstructed picture (e.g., a reference picture) resulting from a decoding process. Alternatively, this current picture may be a reconstructed picture (e.g., a reference picture) generated within an encoding process. The embodiments, however, are not limited to these examples.

Status check module 204c determines the status of storage buffer 106. For example, module 204c may determine whether storage buffer 106 is to be flushed. Conditions for this status may be determined, for example, by video encoding and/or decoding approach(es) employed in the generation of a current picture. For instance, in H.264 decoding, this condition occurs when a current decoded picture is used as an instantaneous decoding refresh (IDR) picture or when a memory_management_control_operation (MMCO) is equal to 5.

In addition, status check module 204c may determine whether storage buffer 106 is full. Module 204c may make this determination after concluding that storage buffer 106 is not to be flushed. Embodiments, however, are not limited to this example.

This determination may comprise checking whether the number of occupied slots in storage buffer 106 equals the number of slots (or MaxSlotSize) within storage buffer 106 (e.g., whether num_occupied_slot=MaxSlotSize). If this condition occurs, then status check module 204c concludes that storage buffer 106 is full. Otherwise, status check module 204c concludes that storage buffer 106 is not full because at least one of its slots is available to be filled.

A find available slot module 204d locates a non-occupied memory slot within storage buffer 106. This operation may involve scanning the memory slots of storage buffer 106 in a particular order, such as by increasing memory address and/or by increasing slot index. Through such scanning, module 204d locates the first available slot that it encounters. When there are multiple available slots, this may be the slot with the lowest memory address and/or slot index. For example, by using a slot index, i, module 204d may identify as an available slot a minimum i, such that the array buffer_occupied[i]=0. An example of such scanning is described in the following pseudo code.

```
For (i=1 To MaxSlotSize) {
    If (slot_occupied[i]==0) {
        current_offset=i
        break
    }
}
```

A flush buffer module 204e removes the contents of storage buffer 106. In addition, flush buffer module 204e reinitializes data identifiers 202 to initial conditions, as described above. This reinitialization may be implemented in various ways, such as by invoking initialization module 204a.

A remove picture module 204f removes the contents of a slot (empties the slot) when storage buffer 106 is full. Module 204f may select a particular slot for emptying based on various factors. For example, H.264 sets forth a removal criterion that selects a short-term-reference frame, complementary reference field pair or non-paired reference field having the smallest FrameNumWrap (with highest reference index). Once removed, parameter 202a (num_occupied_slot) is decremented.

Module 204f may select a slot for emptying by evaluating characteristics of each stored picture representation. This may involve parsing information included in these representations. Alternatively, module 204f may select a slot based on an indicator that designates a particular slot for removal. Such an indicator may be maintained in accordance with various removal criteria upon the storage of each picture representation.

A store picture module 204g stores a picture in a slot 116 of storage buffer 106. Such storage may be performed, for example, after a status check of storage buffer 106 is completed.

Module 204g may determine the current picture's type. For example, module 204g may determine whether the picture is a field picture or a frame picture. Such determinations may comprise deciphering picture type information conveyed in the current picture representation (e.g., in its bitstream).

If the picture is a frame picture, then module 204g writes the contents of the picture to an available slot 116 within storage buffer 106. This slot may be current_offset, as described above. Also, parameter 202a (num_occupied_slot) is incremented. In addition, the entry within slot availability data structure 202b that corresponds to the available slot (e.g., slot_occupied[current_offset]) is marked as occupied. An example of such features is provided in the following pseudocode.

```
{
Store the current frame picture data in the slot[current_offset]
num_occupied_slot ++
slot_occupied[current_offset]=1
}
```

However, if the picture is a field picture, then store picture module 204g determines whether the current picture is a first field picture or a second field picture.

As described above, last field offset parameter 202c (last_field_offset) indicates the memory offset of last single field picture in storage buffer 106. This field may be set to a value (e.g., null or zero) indicating that no single or unpaired field picture exists in storage buffer 106. Thus, based on such a value, module 204g can determine that the current picture is a first field picture.

When it is determined that the current picture is a first field picture, then the current picture may be stored as a first field picture in an available slot within storage buffer 106. As described above, this available slot may be indicated by the current_offset parameter described above. Storing a first field picture may involve writing the picture to a portion of the available slot that is designated for first field storage.

In contrast, when it is determined that the current picture is a second field picture, then module 204g may locate a slot for storage based on last field offset parameter 202c (last_field_offset).

As described above, last_field_offset may have an initialized value of zero. Alternatively, last_field_offset may have a non-zero value. Such a value indicates a particular slot within storage buffer 106 that already contains data of a single field picture. More particularly, such a value indicates that the current picture is a second field picture, and that the corresponding first field picture is already stored in the slot identified by last_field_offset.

Thus, when the current picture is a second field picture (i.e., when slot_field_offset has a non-zero value), the current field picture is stored in the slot identified by slot_field_offset. This may involve writing the picture to a portion of this slot that is designated for second field storage. Upon storing this picture, indicators 202 are updated. For instance parameter 202a (num_occupied_slot) is incremented, and data structure 202b (slot_occupied) is updated to indicate that the slot identified by parameter 202c (slot_field_offset) is occupied. Also, parameter 202c (last_field_offset) may be reinitialized to a zero or null value. Examples of these storage-related operations are described in the following pseudo code.

```
{
Store the current field picture (2nd field) data in the slot[last_field_offset]
num_occupied_slot ++
slot_occupied[last_field_offset]=1
last_field_offset=Null
}
```

As described above, embodiments may store picture representations that are reconstructed according to H.264 encoding and/or decoding operations. H.264 (also known as advanced video codec (AVC) and MPEG-4 Part 10) is the latest video compression standard to be widely pursued by industry. H.264 was developed by the Joint Video Team (JVT), which consisted of ITU Telecommunication Standardization Sector (ITU-T) group SG16 Q.6, (also known as the Video Coding Expert Group (VCEG)), and a group ISO/IEC JTC1/SC29/WG11 of the International Standards Organization (ISO) and the International Electrotechnical Commission (IEC) (also known as the Moving Picture Expert Group (MPEG)). In addition, H.264 extension (also referred to as Joint Scalable Video Codec (JVSC)), which is the Amendment 3 of H.264 requires multiple reference picture storage. H.264 and it extensions, versions, and variants, are referred to herein as being H.264 based.

H.264 is designed for various applications, such as digital television broadcast (DTV), direct broadcast satellite (DBS) video, digital subscriber line (DSL) video, interactive storage media (ISM), multimedia messaging (MMM), digital terrestrial television broadcast (DTTB), remote video surveillance (RVS), as well as other applications.

Figure 3:
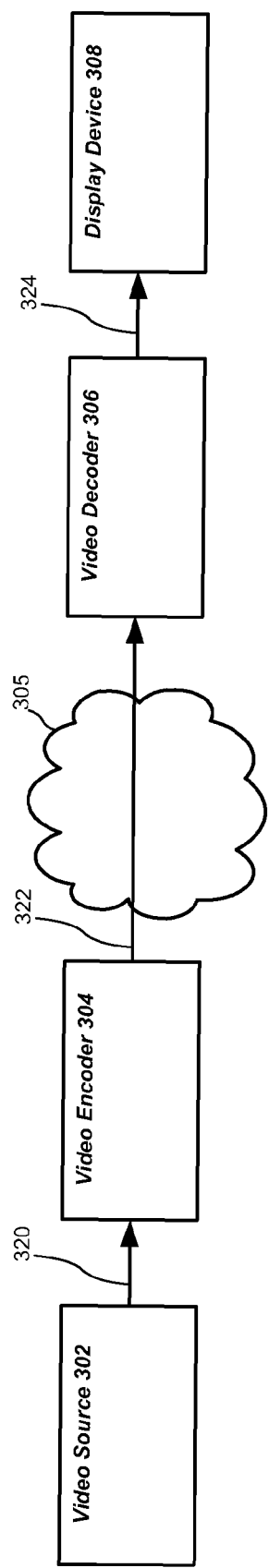
FIG. 3 is a block diagram showing a typical video coding flow.

FIG. 3 is a block diagram showing a typical video coding flow. Although described in the context of H.264, this flow may involve various other coding schemes. Examples of such schemes include, for example, one or more MPEG standards, such as MPEG-2. Also, other schemes, such as one or more standards established by ITU-T may be employed. Examples of such standards include H.261 and H.263. Moreover, the flow of FIG. 3 is not limited to video, but may be employed for other forms of content, such as audio and/or graphics.

In particular, FIG. 3 shows a video source 302 generating an unencoded video signal 320. Accordingly, signal 320 (which may be either analog or digital) provides image data (e.g., sets of pixel intensity values) for a series of frame and/or field pairings. An encoder 304 (e.g., an H.264 video encoder) generates an encoded stream 322 from signal 320. This generation may take advantage of temporal and/or spatial redundancies to reduce the amount of necessary data in stream 322.

As shown in FIG. 3, data stream 322 may be transmitted across a communications interface 305 (e.g., a packet network, cable interface, RF link, etc.) to a decoder 306. Decoder 306 employs decoding techniques, such as H.264 techniques, to generate a decoded video stream 324. As shown in FIG. 3, decoded video stream 324 is sent to a display device 308 for output to one or more users.

As described above, encoder 304 may take advantage of temporal and/or spatial redundancies to reduce the amount of necessary data in encoded stream 322. H.264 is a block-based coding technique to utilize the transform coding and entropy coding on the residue of a motion compensated block. H.264 achieves excellent coding efficiency by employing various video coding approaches to exploit temporal dependency existing across many pictures. One such approach is multi-picture motion-compensated prediction.

This approach allows the selection of reference picture(s), for motion compensation purposes, from among a larger number of pictures which have been decoded and stored by the decoder (e.g., decoder 306).

In H.264, the minimum image unit upon which motion compensation is applied is called a submacroblock (SubMB). A SubMB may be, for example, an 8 pixel by 8 pixel block. Motion compensation for a SubMB is performed with reference to various reconstructed reference pictures. Thus, multi-picture motion-compensated prediction may involve (for both encoding and decoding) the storage of such reference pictures in a multi-picture memory buffer.

Such reference pictures may be used for inter picture prediction. That is, the reference pictures are stored in reference lists for later use. Such stored reference pictures may include reconstructed picture pixel values and accompanying parameter data. Examples of such parameter data include motion vector and reference picture index.

Figure 4:
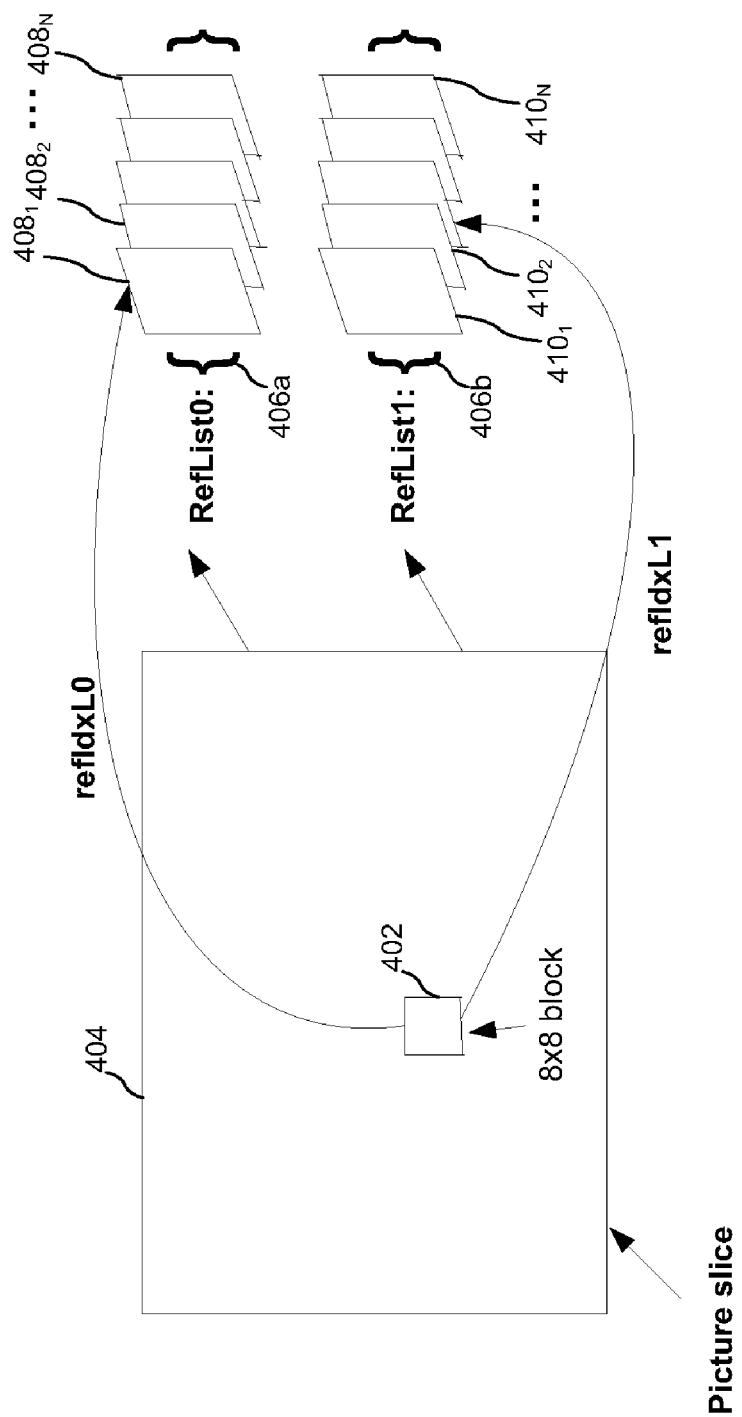
FIG. 4 illustrates an example of reference image lists.

H.264 specifies that the reference pictures to be used for SubMBs be placed in two reference picture lists, RefList0 and RefList1. FIG. 4 illustrates an example of such lists. In particular, FIG. 4 shows a SubMB 402 within an image 404. Also, FIG. 4 shows a first reference list 406a (also shown as RefList0) and a second reference list 406b (also shown as RefList1). These lists store reference pictures 408 and 410. FIG. 4 further shows that, to perform motion compensation for SubMB 402, reference pictures may be accessed from list 406a and 406b through the use of indices refList0 and refList1, respectively.

For example, an H.264 video decoder may need to derive the reference indices in both RefList0 and RefList1 lists in order to find and access a reference picture corresponding to a SubMB in an H.264 bitstream (e.g., a B-slice mode video bitstream). Once accessed, the video decoder may use a motion vector to retrieve information of a corresponding reference SubMB in the accessed reference picture. Through this retrieval, the target SubMB may be decoded.

H.264 allows reference picture lists to be reordered at every slice. Thus, the order of pictures in the reference picture list may change on a slice per slice basis. Further, a particular reference picture may be stored in more than one index in the reference picture lists RefList0 or RefList1. Also, reference pictures may be removed from the reference lists when they are full. Such changes may also occur on a slice per slice basis. Moreover, entries in such reference lists may store different picture types. For instance, a list entry may store a decoded frame, a decoded complementary field pair, or a single (i.e., non-paired) decoded field.

Thus, the storage of and management of multiple reference pictures presents challenges. Accordingly, the techniques described herein provide an efficient technique to access a storage buffer, such as storage buffer 106, for multiple reconstructed pictures and their associated parameter data from a fixed space of a physical memory device. Moreover, such a storage buffer may be used in maintaining multiple lists, such as refList0 and refList1.

Figure 5:
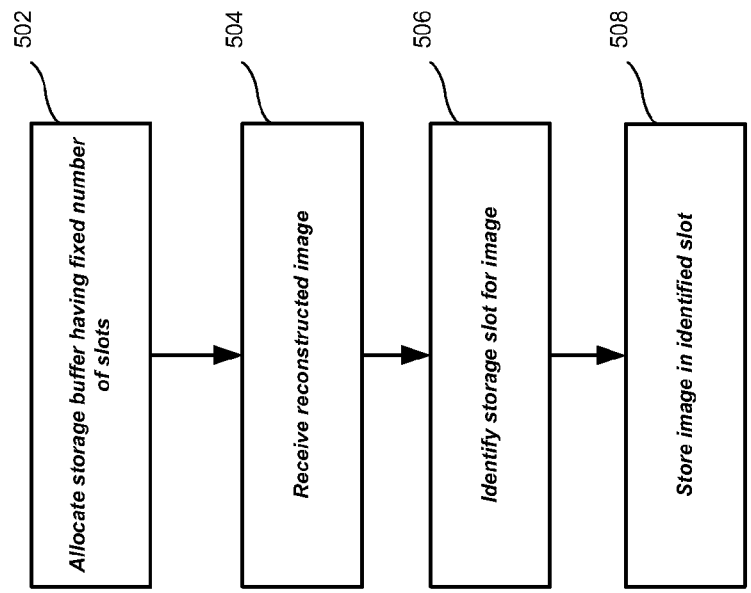
FIGS. 5 and 6 illustrate embodiments of logic diagrams.

FIG. 5 illustrates a embodiment of a logic flow. In particular FIG. 5 illustrates a logic flow 500, which may be representative of the operations executed by one or more embodiments described herein. As shown in logic flow 500, a buffer having a fixed number of storage slots is allocated at a block 502. At a block 504, a reconstructed picture (e.g., a reference picture) is received from an image processing apparatus, such as a video decoder and/or a video encoder. At a block 506, one of the storage slots is identified for the reconstructed picture. The reference picture is then stored in the identified storage slot at a block 508.

Figure 6:
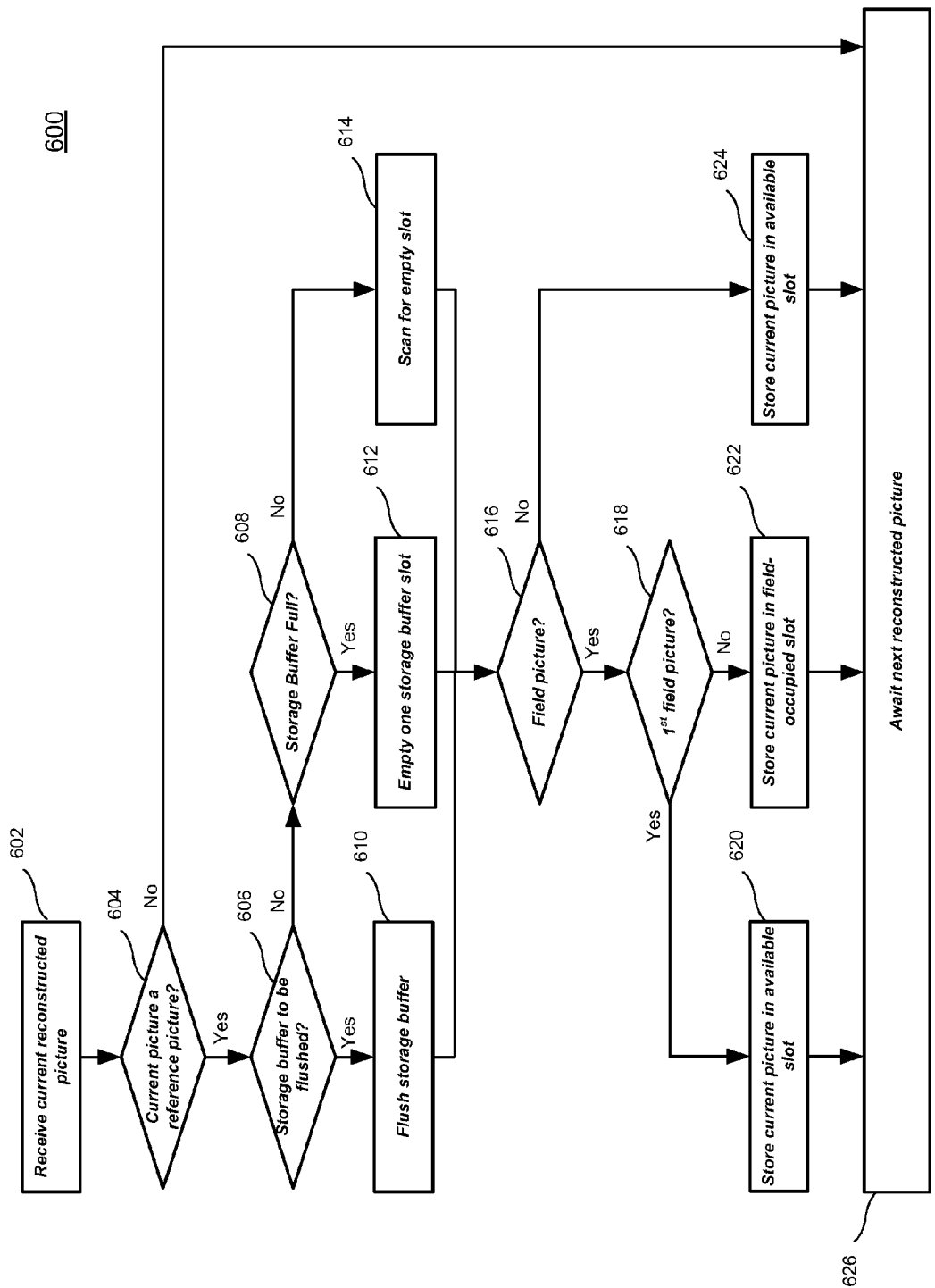

FIG. 6 illustrates a further embodiment of a logic flow. In particular FIG. 6 illustrates a logic flow 600, which may be representative of the operations executed by one or more embodiments described herein. As shown in logic flow 600, a current reconstructed picture representation (also referred to as a current picture) is received at a block 602. This picture representation may be received, for example, from an image processing module, video decoder, and/or video encoder. Accordingly, block 602 may involve employing receive current picture module 204b. The embodiments, however, are not limited to these examples.

At a block 604, it is determined whether the current picture is a reference picture. If so, then at a block 606, it is determined whether a storage buffer, such as storage buffer 106, needs to be flushed. This may comprise, for example, invoking status check module 204c. If the storage buffer is to be flushed, then it is emptied at a block 610. This may comprise, for example, invoking flush buffer module 204e.

However, if the storage buffer does not need to be flushed, then it is determined, at a block 608, whether it full. If so, then a slot is emptied at a block 612. This may involve employment of find available slot module 204d. Otherwise, the storage buffer is scanned for an empty slot at a block 614. This scanning may involve find available slot module 204d.

FIG. 6 shows a block 616 following blocks 610, 612, and 614. At this block, it is determined whether the current picture is a field picture. If not, then the current picture (a frame picture) is stored in an available slot at a block 624. This available slot, may be an available slot found at block 614, a slot that was emptied at block 612, or any slot within the storage buffer (e.g., its first slot) when the buffer has been flushed at block 610.

If the current picture is a field picture, a block 618 follows block 616. This block determines whether the current picture is a first field picture. If so, then (at a block 620), the picture is stored in an available slot. As with block 624, this available slot, may be an available slot found at block 614, a slot that was emptied at block 612, or any slot within the storage buffer (e.g., its first slot) when the buffer has been flushed at block 610. FIG. 6 shows that if the current picture is a second field picture, then it is stored in a slot occupied by its corresponding first field picture at a block 622.

Figure 7:
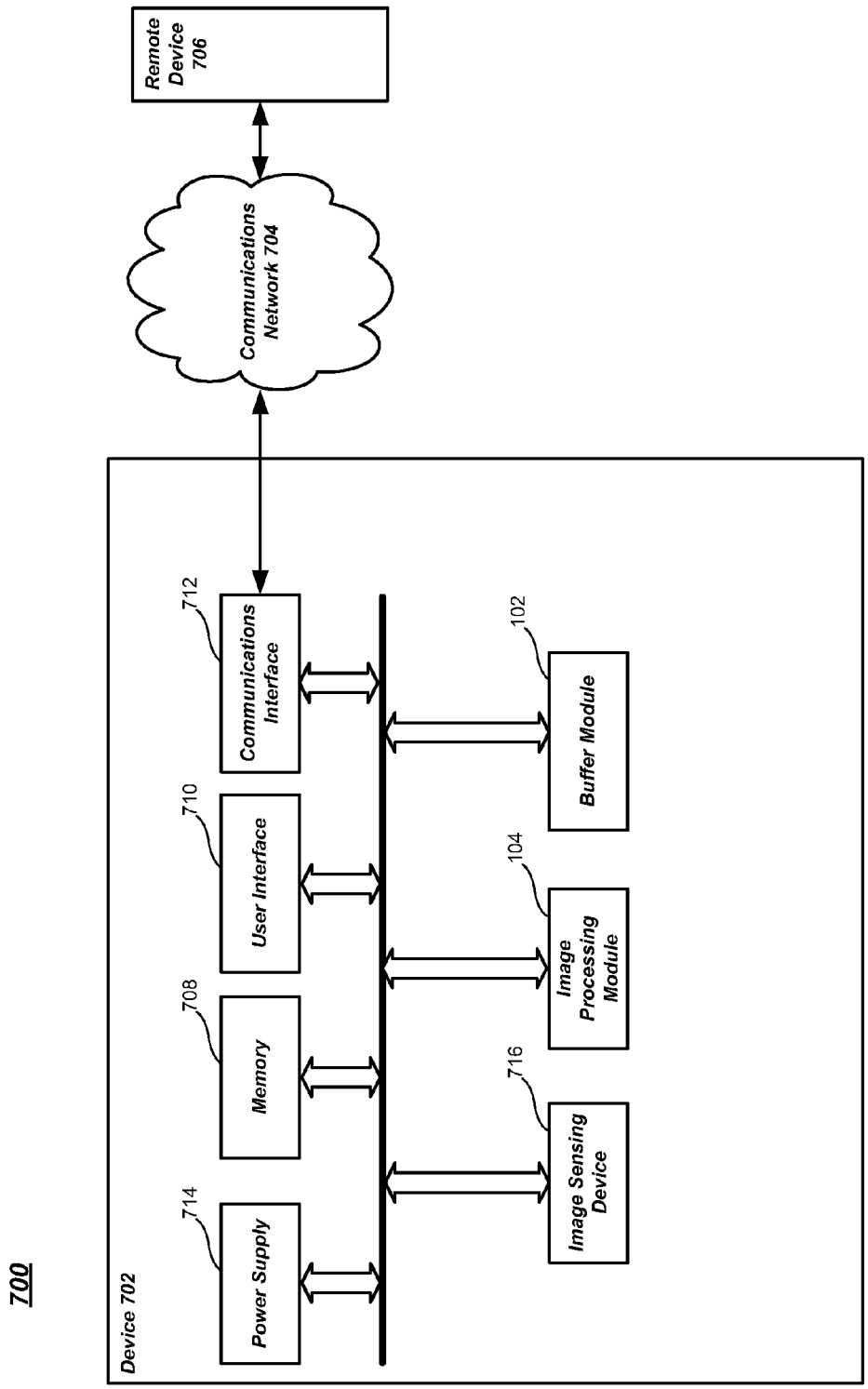
FIG. 7 illustrates one embodiment of a system.

FIG. 7 illustrates an embodiment of a system 700. This system may be representative of a system or architecture suitable for use with one or more embodiments described herein, such as apparatus 100 and implementation 200, as well as with logic flows 500, 600, and so forth. Accordingly, system 700 may capture images and perform fall-off compression according to techniques, such as the ones described herein. In addition, system 700 may display images and store corresponding data. Moreover, system 700 may exchange image data with remote devices.

As shown in FIG. 7, system 700 may include a device 702, a communications network 704, and one or more remote devices 706. FIG. 7 shows that device 702 may include the elements of FIG. 1. In addition, device 702 may include a memory 708, a user interface 710, a communications interface 712, a power supply 714, and an image sensing device

716. These elements may be coupled according to various techniques. One such technique involves employment of one or more bus interfaces.

Memory 708 may store information in the form of data. For instance, memory 708 may contain storage buffer 106 and buffer status unit 110. Alternatively or additionally, memory 708 may store control logic, instructions, and/or software components. These software components include instructions that can be executed by a processor. For example, operational modules 104 may be implemented as such. Also, such logic, instructions, and/or software components may provide functionality of one or more elements in system 700.

Memory 708 may be implemented using any machine-readable or computer-readable media capable of storing data, including both volatile and non-volatile memory. For example, memory 708 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 708 may be included in other elements of system 700. For instance, some or all of memory 708 may be included on a same integrated circuit or chip with as image processing module 106. Alternatively some portion or all of memory 708 may be disposed on an integrated circuit or other medium, for example a hard disk drive, which is external. The embodiments are not limited in this context.

User interface 710 facilitates user interaction with device 702. This interaction may involve the input of information from a user and/or the output of information to a user. Accordingly, user interface 710 may include one or more devices, such as a keypad, a touch screen, a microphone, and/or an audio speaker. In addition, user interface 710 may include a display to output information and/or render images/video processed by device 702. Exemplary displays include liquid crystal displays (LCDs), plasma displays, and video displays.

Communications interface 712 provides for the exchange of information with other devices across communications media, such as network. This information may include image and/or video signals transmitted by device 702. Also, this information may include transmissions received from remote devices, such as image/video transmissions from a remote device.

Communications interface 712 may provide for wireless or wired communications. For wireless communications, communications interface 712 may include components, such as a transceiver, an antenna, and control logic to perform operations according to one or more communications protocols. Thus, communications interface 712 may communicate across wireless networks according to various protocols. For example, device 702 and device(s) 706 may operate in accordance with various wireless local area network (WLAN) protocols, such as the IEEE 802.11 series of protocols, including the IEEE 802.11a, 802.11b, 802.11e, 802.11g, 802.11n, and so forth. In another example, these devices may operate in accordance with various wireless metropolitan area network (WMAN) mobile broadband wireless access (MBWA) protocols, such as a protocol from the IEEE 802.16 or 802.20 series of protocols. In another example, these devices may operate in accordance with various wireless personal area networks (WPAN). Such networks include, for example, IEEE 802.16e, Bluetooth, and the like. Also, these devices may operate according to Worldwide Interoperability for Microwave Access (WiMax) protocols, such as ones specified by IEEE 802.16.

Also, these devices may employ wireless cellular protocols in accordance with one or more standards. These cellular standards may comprise, for example, Code Division Multiple Access (CDMA), CDMA 2000, Wideband Code-Division Multiple Access (W-CDMA), Enhanced General Packet Radio Service (GPRS), among other standards. The embodiments, however, are not limited in this context.

For wired communications, communications interface 712 may include components, such as a transceiver and control logic to perform operations according to one or more communications protocols. Examples of such communications protocols include Ethernet (e.g., IEEE 802.3) protocols, integrated services digital network (ISDN) protocols, public switched telephone network (PSTN) protocols, and various cable protocols.

In addition, communications interface 712 may include input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Power supply 714 provides operational power to elements of device 702. Accordingly, power supply 714 may include an interface to an external power source, such as an alternating current (AC) source. Additionally or alternatively, power supply 714 may include a battery. Such a battery may be removable and/or rechargeable. However, the embodiments are not limited to this example.

Image sensing device 716 may be used to capture images for encoding, for example, by image processing module 104. Accordingly, device 716 may include various optical components, image sensing elements, and control elements.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a buffer having a fixed number of storage slots, each storage slot to store a reconstructed picture representation received from an image processing module;
a buffer status unit to store a plurality of information items, the plurality of information items to indicate one or more characteristics of the buffer;
a buffer control module to manage storage within the buffer and to store the reconstructed picture representation in the buffer based on the type of the reconstructed picture representation; and
a remove picture module to select one of the storage slots for emptying by parsing information included in each stored reconstructed picture representation and evaluating a characteristic of each stored reconstructed picture representation, and to empty the selected storage slot when the buffer is full.

2. The apparatus of claim 1, further comprising:
a store picture module to determine whether a current picture is a field picture or a frame picture and to determine where in the buffer to store the current picture accordingly.

3. The apparatus of claim 2, the store picture module further to:
determine whether a field picture is a first or second field picture;
store a first field picture in a portion designated for first field picture storage of an available slot in the buffer; and
store a second field picture in the buffer by locating a slot for storage based on a last field offset parameter, wherein the last field offset parameter indicates a slot in the buffer where a corresponding first field picture is already stored.

4. An apparatus, comprising:
a video decoder to generate decoded video signals according to an inter-prediction technique, the inter-prediction technique employing a plurality of reconstructed reference picture representations;
a buffer having a fixed number of storage slots to store the plurality of reconstructed reference picture representations;
a buffer status unit to store a plurality of information items, the plurality of information items to indicate one or more characteristics of the buffer;
a buffer control module to manage storage within the buffer; and
a remove picture module to select one of the storage slots for emptying by parsing information included in each stored reconstructed reference picture representation and evaluating a characteristic of each stored reconstructed reference picture representation, and to empty the selected storage slot when the buffer is full.

5. The apparatus of claim 4, further comprising:
a store picture module to determine whether a current picture is a field picture or a frame picture and to determine where in the buffer to store the current picture accordingly.

6. The apparatus of claim 5, the store picture module further to:
determine whether a field picture is a first or second field picture;
store a first field picture in a portion designated for first field picture storage of an available slot in the buffer; and
store a second field picture in the buffer by locating a slot for storage based on a last field offset parameter, wherein the last field offset parameter indicates a slot in the buffer where a corresponding first field picture is already stored.

7. A method, comprising:
allocating a buffer having a fixed number of storage slots;
receiving a reconstructed reference picture from a video decoder;
identifying one of the storage slots for the reconstructed picture based on the type of the reconstructed reference picture;
storing the reconstructed picture in the identified storage slot; and
selecting a storage slot to empty by parsing information included in each stored reconstructed picture and evaluating a characteristic of each stored reconstructed picture, and emptying the selected storage slots when the buffer is full.

8. The method of claim 7, wherein identifying one of the storage slots for the reconstructed picture based on the type of the reconstructed reference picture comprises determining whether a current picture is a field picture or a frame picture.

9. The method of claim 8, further comprising:
determining whether a field picture is a first or second field picture;
storing a first field picture in a portion designated for first field picture storage of an available slot in the buffer; and
storing a second field picture in the buffer by locating a slot for storage based on a last field offset parameter, wherein the last field offset parameter indicates a slot in the buffer where a corresponding first field picture is already stored.

10. An article comprising a machine-readable non-transitory storage medium containing instructions that if executed enable a system to:
allocate a buffer having a fixed number of storage slots;
receive a reconstructed reference picture from a video decoder;
identify one of the storage slots for the reconstructed picture based on the type of the reconstructed reference picture;
store the reconstructed picture in the identified storage slot; and
select a storage slot to empty by parsing information included in each stored reconstructed picture and evaluating a characteristic of each stored reconstructed picture, and empty the selected storage slots when the buffer is full.

* * * * *